United States Patent
Sekhar et al.

(10) Patent No.: US 11,783,605 B1
(45) Date of Patent: Oct. 10, 2023

(54) GENERALIZABLE KEY-VALUE SET EXTRACTION FROM DOCUMENTS USING MACHINE LEARNING MODELS

(71) Applicant: INTUIT INC., Mountain View, CA (US)

(72) Inventors: Amogha Sekhar, Mountain View, CA (US); Eric Vanoeveren, San Diego, CA (US); Deepankar Mohapatra, Plano, TX (US); Tharathorn Rimchala, Mountain View, CA (US); Priyadarshini Rajendran, Little Elm, TX (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 17/855,469

(22) Filed: Jun. 30, 2022

(51) Int. Cl.
  *G06K 9/00* (2022.01)
  *G06V 30/14* (2022.01)
  *G06V 30/19* (2022.01)

(52) U.S. Cl.
  CPC .... *G06V 30/1448* (2022.01); *G06V 30/19173* (2022.01)

(58) Field of Classification Search
  CPC . G06T 11/60; G06T 11/00; G06T 2201/0081; G06T 2210/22; G06T 1/0021; G06T 2207/30128; G06T 7/0004; G06T 7/62; G06T 7/66; G06T 1/0028; G06T 2201/0051; G06T 2201/0052; G06T 2201/0061; G06T 2201/0083; G06T 3/0012; G06F 16/583; G06F 21/62; G06F 21/64; G06F 21/84; G06F 16/58; G06F 16/5838; G06F 16/5854; G06F 3/011; G06F 40/174; G06F 40/263
  See application file for complete search history.

(56) References Cited

U.S. PATENT DOCUMENTS

| | | | | |
|---|---|---|---|---|
| 2005/0165747 | A1* | 7/2005 | Bargeron | G06V 30/414 707/E17.022 |
| 2019/0384954 | A1* | 12/2019 | Lyubimov | G06T 7/187 |
| 2021/0064865 | A1 | 3/2021 | Rimchala et al. | |

OTHER PUBLICATIONS

Zhang, Hibert: Document Level Pre-training of Hierarchical Bidirectional Transformers for Document Summarization, May 2019, arXiv (Year: 2019).*

* cited by examiner

*Primary Examiner* — Alex Kok S Liew
(74) *Attorney, Agent, or Firm* — Patterson + Sheridan, LLP (57) ABSTRACT

Certain aspects of the present disclosure provide techniques for training and using machine learning models to extract key-value sets from a document. An example method generally includes identifying regions of a document including key-value sets corresponding to inputs to a data processing application based on a first machine learning model and an electronic version of the document. One or more keys and one or more values are identified in the document based on a second machine learning model. One or more key-value sets are generated based on matching keys of the one or more keys and values of the one or more values in the region of the document. The one or more key-value sets are provided to a data processing application for processing.

14 Claims, 5 Drawing Sheets

GENERALIZABLE KEY-VALUE SET EXTRACTION FROM DOCUMENTS USING MACHINE LEARNING MODELS

INTRODUCTION

Aspects of the present disclosure generally relate to data extraction in software applications, and more specifically to extracting key-value data sets from documents using machine learning models.

BACKGROUND

Documents and forms may be used to record or reflect information or data about a person, business, event, or other matter. The document may contain fields for specific types of information. Each field may have a label (or key) allowing a user to identify it or instructing the user regarding what type of information is held within or should be entered into the field (e.g., the value(s) to be stored in the field). Depending on the type of document, a single field may have multiple sections for multiple inputs related to the subject of the field. In some cases, users seek to digitize documents to make them more searchable, usable, or accessible. In many instances, this is done by uploading a photo of the document, and then utilizing a software application with a generic extractor in order to extract the information from the document (e.g., via optical character recognition (OCR) techniques).

In many cases, data may need to be extracted from many different documents in order to complete a workflow. To extract data from many documents, machine learning models may be trained and used to extract data from each specific type of document. For example, in a tax preparation workflow, a first machine learning model may be used to extract data from wage income statements, a second machine learning model may be used to extract data from partnership income statements, a third machine learning model may be used to extract data from investment income statements, and so on. Because many machine learning models may be trained, deployed, and maintained, significant amounts of computing resources may be expended in training and maintaining these machine learning models. Further, as the number of documents involved in a workflow, and the number of variants of a document involved in a workflow, increase, it may become increasingly difficult to efficiently maintain these machine learning models.

Accordingly, techniques are needed to extract data from a variety of documents used in a workflow.

BRIEF SUMMARY

Certain embodiments provide a computer-implemented method for extracting key-value sets from a document using machine learning models. An example method generally includes identifying regions of a document including key-value sets corresponding to inputs to a data processing application based on a first machine learning model and an electronic image of the document. One or more keys and one or more values are identified in the document based on a second machine learning model. One or more key-value sets are generated based on matching keys of the one or more keys and values of the one or more values in the region of the document. The one or more key-value sets are input to a data processing application for processing.

Other embodiments provide a computer-implemented method for training machine learning models to extract key-value sets from a variety of documents. An example method generally includes training a first machine learning model to identify regions of an input document including key-value sets corresponding to inputs to a data processing application using a training data set including electronic images of documents labeled with information identifying locations of key-value sets in the documents and textual annotations identifying keys and values in the key-value sets. A second machine learning model is trained to identify keys and values in an input document based on the training data set.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for training and using machine learning models to extract data from a document, and more specifically to using machine learning models to identify and extract key-value sets from a document.

As discussed above, digital images of documents, or digital documents, may be used to provide data to a workflow of a software application for processing. These documents generally include keys identifying the type of data stored in different fields of the document and values associated with these fields. The information contained in a document may generally be specific to a specific type of document, and any specific type of document may have many different formats. Because of the variety of documents that may be used to complete a workflow and the variety of formats in which any specific document may be formatted, many machine learning models are generally used to extract data from these documents. However, maintaining many machine learning models to extract data from a universe of documents may be a computationally and operationally expensive task, and may also require significant memory storage space, which may make it infeasible to leverage such models on many types of devices, such as mobile devices or other computing devices with limited computational resources.

Further, in many cases, these machine learning models may extract data based on an assumed one-to-one correspondence between fields and values stored in these fields. However, while some fields may be associated with a single value, this may not be true for all fields in a document. Some fields in some documents may, in fact, support multiple values; for example, a field such as Box 12 in IRS form W-2 may include no data at all or may include multiple values, with each value being associated with a different type of data but corresponding to the same key (e.g., of miscellaneous compensation). Thus, a machine learning model that assumes one-to-one correspondence between fields and values stored in these fields may not accurately extract data from these fields.

Embodiments presented herein provide techniques for training and using machine learning models that can flexibly extract data from any of a variety of documents. As discussed in further detail herein, a first machine learning model may identify segments in a document that include one or more key-value data sets, and a second machine learning model may identify keys and values in the document. Based on the identified segments and the identified keys and values in the document, one or more key-value sets may be generated, reflecting the pairings of keys and values stored in a document. Because the first machine learning model and the second machine learning model are trained to identify regions of a document in which key-value sets are located and to identify keys and values in a document without being tightly coupled to a specific type of document, aspects of the present disclosure generally allow these machine learning models to extract data from any of a variety of documents, regardless of the type of document or the format in which these documents are laid out. Thus, aspects of the present disclosure may reduce the amount of computing resources (e.g., processing cycles, memory, time, etc.) needed to train and maintain machine learning models to extract data from specific types of documents. Further, because the machine learning models discussed herein may allow for extraction of key-value sets from a variety of documents, these models may not need to be retrained as new versions of these documents (e.g., with new data fields, different layouts or formats, etc.) are created, further reducing the computational expense of maintaining machine learning models to extract data from a universe of documents. Further, because a single set of machine learning models may be deployed to extract data from many types of documents and many different formats of the same document, aspects of the present disclosure may further allow for these models to be deployed across a variety of types of devices with differing amounts of computational resources.

Figure 1:
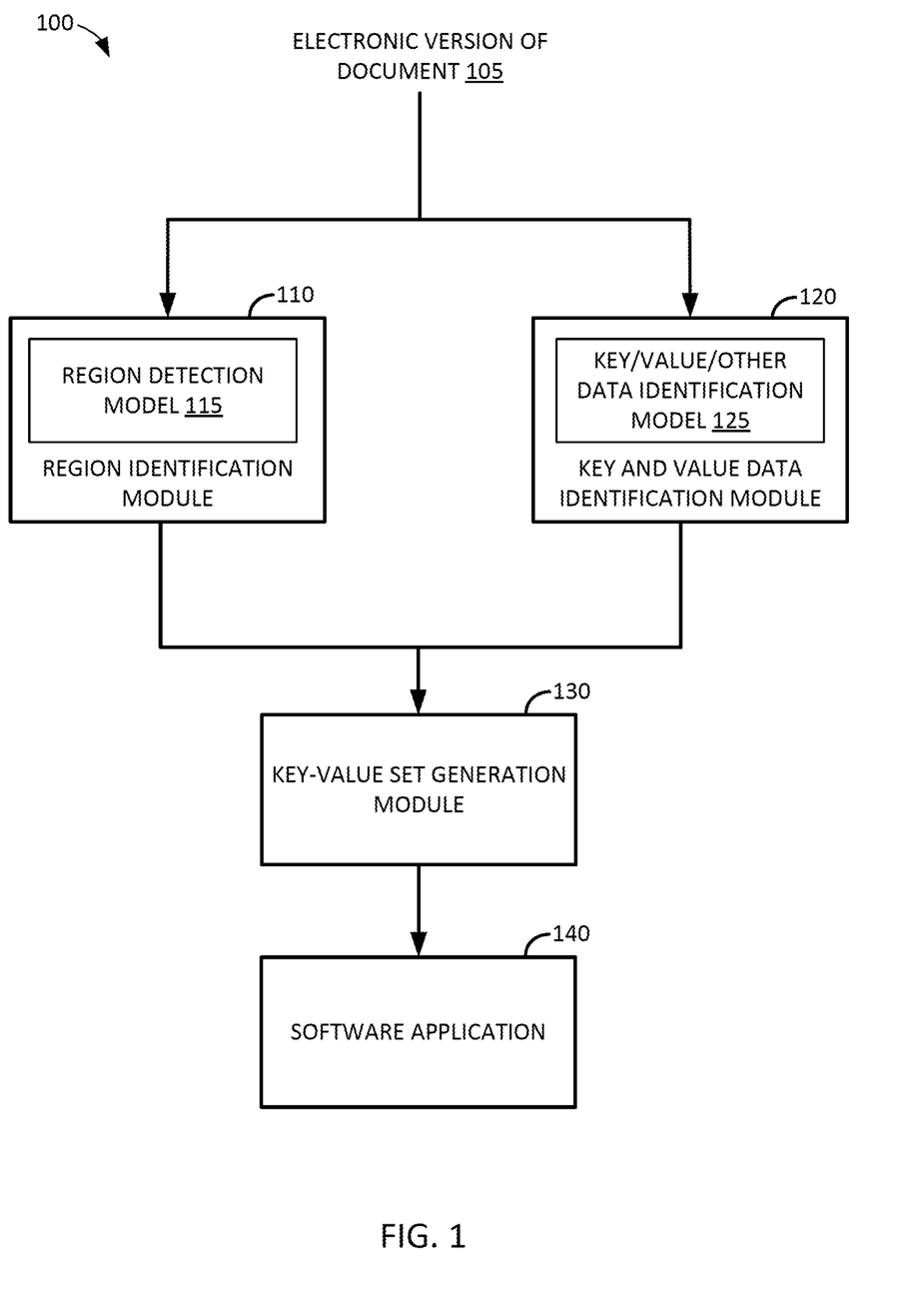
FIG. 1 is a flow chart illustrating the generation of key-value sets from a document using a first machine learning model configured to identify regions in a document in which key-value sets are located and a second machine learning model configured to identify keys and values in a document.

Example Extraction of Key-Value Sets from Documents Using Machine Learning Models FIG. 1 is a flow chart illustrating an operation 100 for extracting key-value sets from a document using a first machine learning model configured to detect regions in a document in which key-value sets are located and a second machine learning model configured to classify text in a document as a key, a value, or neither-key-nor-value data.

A machine learning model trainer, which may be external to operation 100, generally generates a training data set from electronic versions of documents (e.g., electronic images of a document or an electronic document) and trains machine learning models used by region identification module 110 and key and value data identification module 120 to identify regions in a document in which key-value sets are located and to identify keys and values in the document. To generate the training data set, the machine learning model trainer may, in some aspects, retrieve a data set from a data repository including a plurality of electronic versions of documents (or electronic documents), which the machine learning models are to be used in extracting key-value sets. Each electronic document of the plurality of electronic documents generally corresponds to one of a plurality of documents for which key-value sets are to be extracted using the first machine learning model and the second machine learning model. For each electronic document in the plurality of electronic documents, a text recognition engine may be used to extract text from the electronic document. A data set may subsequently be generated for the electronic document based on annotated value sets and a defined set of keys. The generated data set generally identifies the keys and values in the respective electronic document.

For example, a data set generated for an electronic image of an IRS form W-2 may be generated by extracting text from the electronic image of this form. Because form W-2 generally has a defined format including various fields and data associated with these fields, the image may be associated with annotations identifying the values stored in this form and the keys associated with different fields in the form. Thus, the data set may be generated with a first set of text extracted from the electronic image of the form labeled as key data and a second set of text extracted from the electronic image of the form labeled as value data. To allow the machine learning models trained by the machine learning model trainer to be generalizable across different types of documents, and to allow for the machine learning models to extract data from electronic images of documents without assuming a one-to-one correspondence between keys and values, however, the keys may not be associated with specific values in the document.

Generally, each document may have a plurality of locations in which key-value sets are located. To allow a machine learning model to identify locations in a document in which key-value pairs are included, electronic versions of the document may be associated with location information (e.g., two-dimensional positional information) identifying each location in which a key-value set is located in the document. An electronic version of the document may thus be linked to multiple locations in which different key-value pairs are stored in the document.

Two machine learning models may be trained using the training data set generated from the data set including a plurality of electronic versions of documents. A first machine learning model, which is deployed to region identification module 110 after training, may be a computer vision-based model, such as a masked recurrent convolutional neural network (MaskRCNN) that is trained to identify regions of interest in a document in which key-value sets are located. A second machine learning model, which is deployed to key and value data identification module 120 after training, may be a multimodal model that classifies text in an electronic document as a key, a value, or neither a key nor value. As discussed in further detail below, the region information extracted from an electronic version of a document by the first machine learning model may be combined with the key and value information extracted from the electronic version of the document by the second machine learning model to identify and extract key-value sets from the electronic version of the document.

To train the first machine learning model, a model trainer generally trains the model to predict a plurality of masked portions of the electronic version of the document that bind one or more key-value sets. The model may be trained to segment the unmasked region of the document into a plurality of segments, with each segment corresponding to a location of a single key-value set. Generally, the first machine learning model may be trained as an object detection model that treats each region in which a single key-value set is located as a different object in the document.

The second machine learning model may, in some aspects, be trained as a token classification model that treats a sequence of words or sub-word pieces as a token and classifies the token as either a key, a value, or neither. In some aspects, the second machine learning model may be trained as a multimodal model that classifies tokens as a key, value, or neither based on various input modalities, including raw image pixels, the layout of the electronic version of the document, the textual content extracted from the electronic version of the document, and other information that describes the electronic version of the document and the content contained therein. In some aspects, the second machine learning model may be a transformer architecture-based model trained to classify tokens as keys, values, or neither. In such a model, a self-attention mechanism may allow for the classification of tokens based on other contextual information in the data extracted from an electronic version of the document.

Generally, the first machine learning model and the second machine learning model may be trained using supervised or semi-supervised techniques. For example, in training the first machine learning model, a training data set may include a plurality of electronic versions of documents, and each electronic version may be labeled or tagged with information (e.g., two-dimensional positional information) identifying the coordinates of one or more regions of interest in the electronic version of the document in which a key-value set is contained. In training the second machine learning model, the training data set may include textual content extracted from an electronic version of the document, and the textual content may be labeled or tagged with information identifying the classes for each token (e.g., identifying a token as a key, a value, or other data that is neither a key nor a value).

As illustrated, a electronic version of document 105 may be provided to region identification module 110 and a key and value data identification module 120 for processing. Region identification module 110 and key and value data identification module 120 may execute in parallel, using the first machine learning model (e.g., region detection model 115) deployed to region identification module 110 and the second machine learning model (e.g., key/value/other data identification model 125) deployed to key and value data identification module 120, to identify regions in a document in which key-value sets are located and to identify keys and values in the document, respectively. Generally, the identification of the regions in the document in which key-value sets are located and the identification of the keys and values in the document may be independently executable processes that do not rely on the other for completion.

Region identification module 110 generally uses the first machine learning model (e.g., region detection model 115) to generate a plurality of regions of interest identifying locations in the electronic version of document 105 corresponding to locations of the key-value sets. In generating the plurality of regions of interest, region identification module 110 can mask different regions of the electronic version of document 105 that includes some key-value sets and can segment the unmasked region of the electronic version of document 105 into a plurality of segments (or regions of interest) corresponding to different key-value sets. Generally, the output of region identification module 110 may be a plurality of regions of interest, which may be defined in terms of pixel coordinates in the electronic version of document 105 (e.g., of opposite corners of a quadrilateral polygon, or more generally pixel coordinates for a plurality of vertices of a polygon serving as the boundaries of a region in which one or more key-value sets are stored).

Meanwhile, as discussed, key and value data identification module 120 uses the second machine learning model (e.g., key/value/other data identification model 125) to classify textual content included in the electronic version of document105 as a key, a value, or neither. Key and value data identification module 120 may generate a set of keys and a set of values and provide the generated set of keys and the generated set of values to key-value set generation module 130 for use, in combination with the identified locations in the electronic version of document105 corresponding to the location of key-value sets generated by region identification module 110, to generate key-value sets from which data can be extracted. To generate the set of keys and the set of values, key and value identification module 120 can extract textual content from the document image 105 using various text extraction techniques, such as optical character recognition or the like. The resulting data set of text extracted from electronic version of document105 may be input into the second machine learning model, along with layout information and electronic version of document105, to allow the second machine learning model to extract the set of keys and the set of values based on modalities between the extracted text, the electronic version of document105, and the layout of the document.

Figure 2:
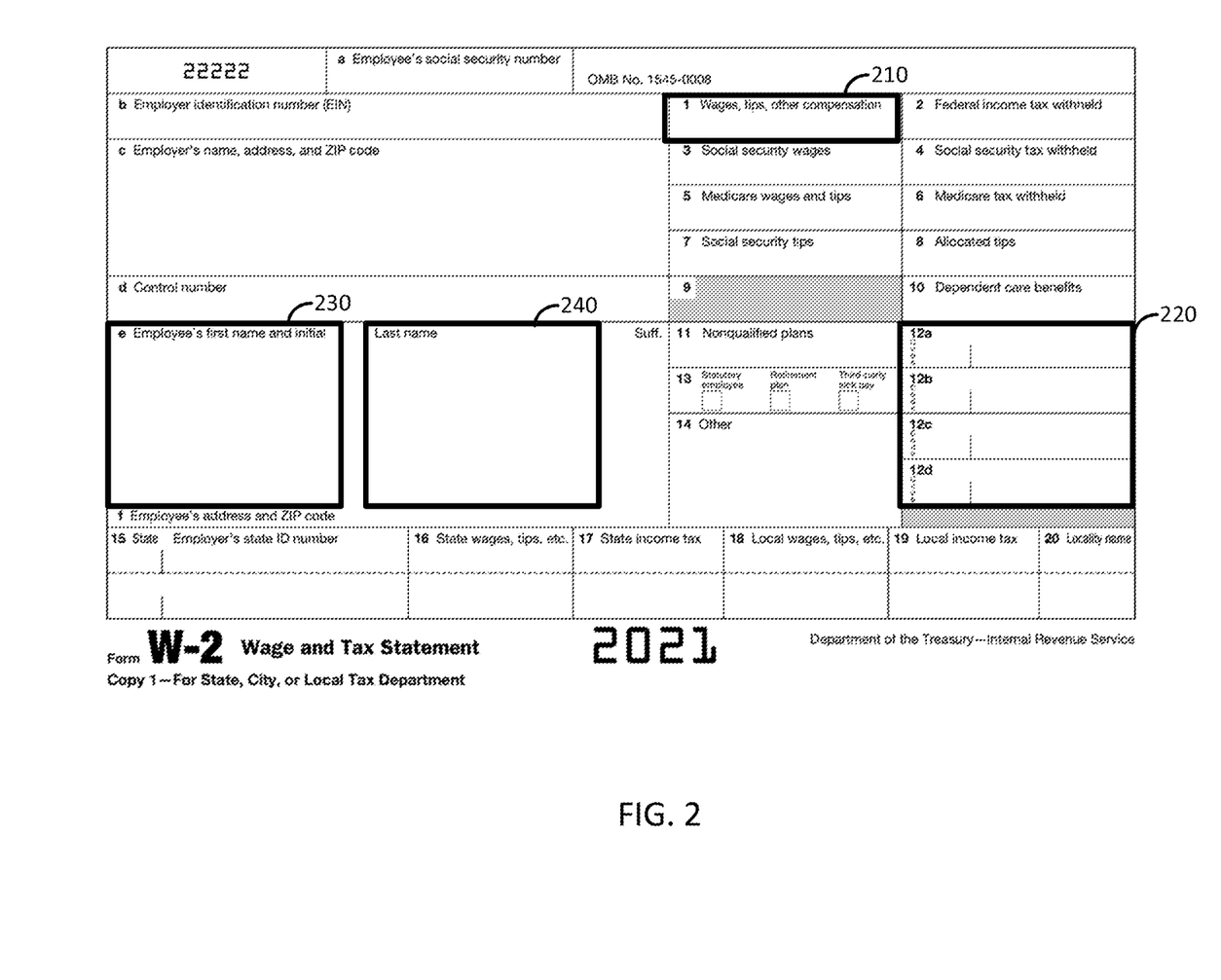
FIG. 2 illustrates an example of a document from which key-value sets can be extracted using a first machine learning model configured to identify regions in a document in which key-value sets are located and a second machine learning model configured to identify keys and values in a document.

Key-value set generation module 130 generally uses the regions identified by region identification module 110 and the set of keys and the set of values generated by key and value data set identification module 120 to generate the key-value sets for the document. To generate a key-value set in the document, key-value set generation module 130 can use the coordinates of a region in which a key-value set is located to identify the keys and values that are contained within the region. That is, a key-value set may be matched or otherwise linked to a specific region in the electronic version of document105 in which the key and value(s) are contained. Because key-value sets are generated based on identifying keys and values that are contained within each region identified by region identification module 110 as a region in which key-value sets are contained, key-value sets extracted from a document for a region may have a one-to-one relationship in which a key is associated with a single value or may have a one-to-many relationship in which a key is associated with multiple values. For example, in a W-2 form, as illustrated in FIG. 2, a key corresponding to Box 12 may be associated with multiple values, while other keys may have one-to-one relationships. Further, because keys and values are extracted independently from the identification of the regions in which these keys and values are located, and because the identification of the regions in which key-value sets are located may be decoupled from the specific document from which the keys and values are extracted, aspects of the present disclosure allow for the use of a single, genericized region identification model and key and value data identification model to identify key-value sets in any of a variety of documents or forms. Thus, aspects of the present disclosure may reduce the amount of computational memory needed to deploy key-value extraction models for different forms or variants of forms, reduce the amount of processing time and other resources needed to train document-specific key-value extraction models, and generally provide for various efficiencies in the use of compute resources to train and use machine learning models to extract key-value sets from various documents.

After the key-value sets are generated by key-value set generation module 130, the key-value sets are provided as input into a software application 140 for further processing. For example, the key-value sets may be provided as input into a workflow exposed by the software application. The key in a key-value set may identify a specific field into which the associated values are to be provided as input into the workflow. After the key-value sets are input into software application 140, one or more operations may be invoked at software application 140 to process the input key-value data sets and generate a result of the workflow.

Example Document Including Key-Value Sets Extracted Using Machine Learning Models FIG. 2 illustrates an example of a document 200 from which key-value sets can be extracted using a first machine learning model configured to identify regions in a document in which key-value sets are located and a second machine learning model configured to identify keys and values in a document.

Document 200 illustrates a W-2 form used in tax preparation workflows; however, it should be recognized that the machine learning models described herein may be used to extract data from a variety of other documents in which key-value sets are stored. A user seeking to prepare taxes using a tax preparation workflow in which the machine learning models described herein are used to extract the key-value sets in the document 200 may upload document 200 to a service that digitizes document 200 and extracts content from document 200.

As illustrated, document 200 includes a plurality of fields in which key-value sets are located. For example, field 210, corresponding to Box 1 of a W-2 form, labeled "Wages, tips, and other compensation." Generally, a single value may be stored in field 210, and thus, field 210 may have a one-to-one relationship between a key describing the data in field 210 and the value of field 210.

In contrast, field 220, corresponding to Box 12 of a W-2 form, may include multiple values (e.g., one in each of boxes 12a, 12b, 12c, and 12d illustrated in field 220). Because field 220 may be associated with a key (e.g., of miscellaneous compensation) and multiple values, field 220 may have a one-to-many relationship between keys and values.

Finally, fields 230 and 240 illustrate an example in which a single box in the W-2 form is divided into two areas in which key-value sets are located. As illustrated, box e of the W-2 form is split into two regions: a first region for an employee's first name and middle initial, and a second region for the employee's last name. Because these are two distinct pieces of data, two regions (fields 230 and 240) in which key-value sets are stored may be identified, or box e may be identified as an area in which keys and values have a many-to-many relationship. In this example, field 230 represents an area in which the employee's first name and middle initial is stored, and thus, the key-value set would include the employee's first name and middle initial as the key and an entry within field 230 as the value. Likewise, field 240 represents an area in which the employee's last name is stored, and thus, the key-value set would include the employee's last name as the key and an entry within field 240 as the value.

Figure 3:
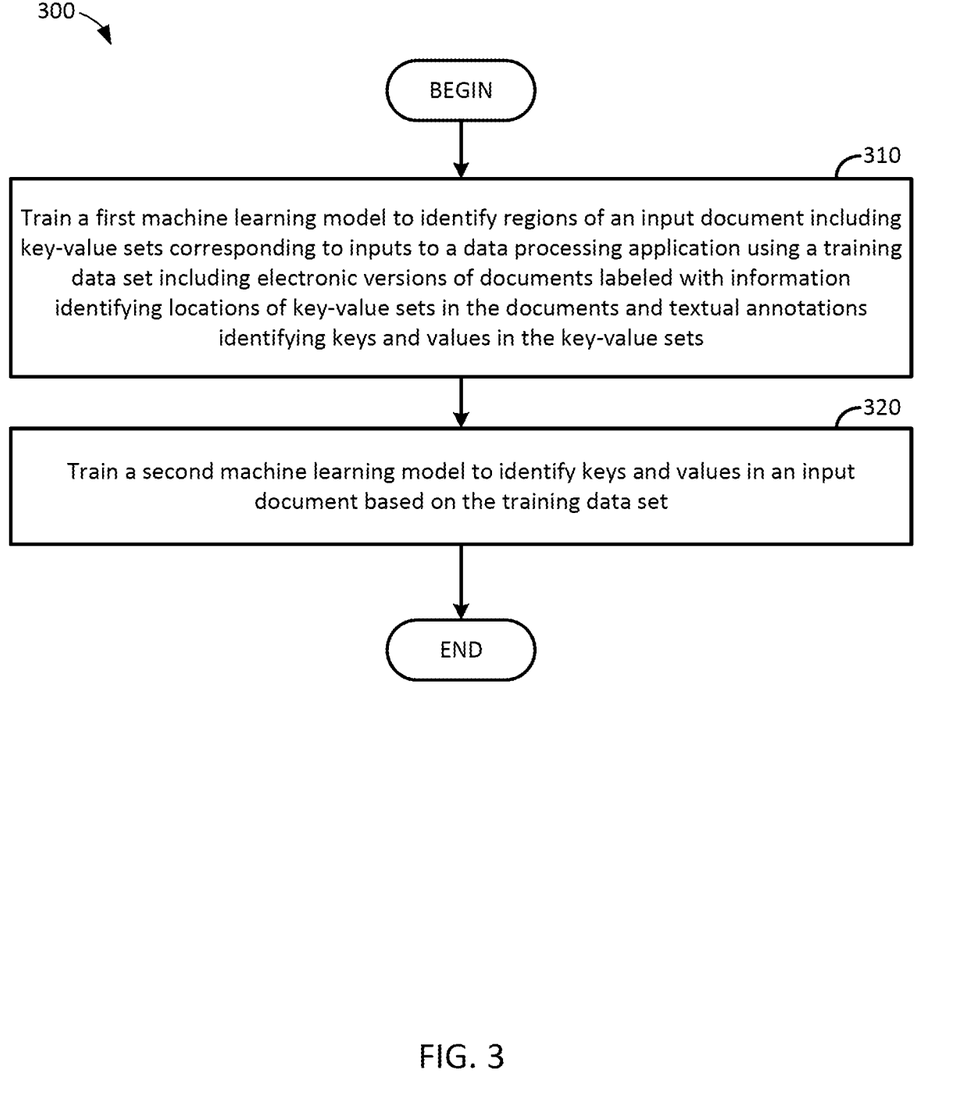
FIG. 3 illustrates example operations for first machine learning model configured to identify regions in a document in which key-value sets are located and a second machine learning model configured to identify keys and values in a document.

Example Computer-Implemented Method for Training a Machine Learning Model to Extract Key-Value Sets from a Plurality of Documents FIG. 3 illustrates example operations 300 for training machine learning models to identify regions in a document in which key-value sets are located and a second machine learning model configured to identify keys and values in a document. Operations 200 may be performed by a model training system, such as a server computer, a cluster of computing devices, or the like, which can train and deploy machine learning models to region identifier module 110 and key and value data identifier module 120 illustrated in FIG. 1.

As illustrated, operations 300 begin at block 310 with training a first machine learning model to identify regions of an input document including key-value sets corresponding to inputs to a data processing application using a training data set including electronic versions of documents labeled with information identifying locations of key-value sets in the documents and textual annotations identifying keys and values in the key-value sets.

In some aspects, the first machine learning model may be a computer vision-based machine learning model, such as a MaskRCNN, deployed to region identification module 110 illustrated in FIG. 1. Generally, these computer vision-based machine learning models may be trained to mask regions of the electronic version of the document that include a key-value set and segment the unmasked region of the document into a plurality of segments, each segment corresponding to a location of a single key-value set. For example, a vision-based machine learning model may be trained to generate a plurality of masks, with each mask masking, or obscuring, a different region of the document. The region of the document masked using any pair of masks may partially, but not wholly, overlap.

At block 320, operations 300 proceed with training a second machine learning model to identify keys and values in an input document based on the training data set.

In some aspects, the second machine learning model may be a multimodal model that is trained to classify tokens in textual content as keys, values, or neither a key nor a value (e.g., other content), deployed to key and value identification module 120 illustrated in FIG. 1. The multimodal model may take into account the context in which these tokens are extracted from text in an electronic image of a document, the layout of the electronic image of the document, and other information which may provide information about the document and the content contained therein. In some aspects, the second machine learning model may be a model that implements a transformer architecture.

In some aspects, the training data set may be generated by retrieving a data set including a plurality of electronic images from an external source, such as a training data repository. Each electronic image of the plurality of electronic images generally corresponds to one of a plurality of documents for which key-value sets are to be extracted using the first machine learning model and the second machine learning model. To generate the training data set, text is extracted from each respective electronic image of the plurality of electronic images. This text may be extracted, for example, using optical character recognition (OCR) techniques, extraction from a natively digital document (e.g., a document stored in the portable document format (PDF)) or other techniques by which textual content can be identified and extracted from an image. A data set identifying keys and values in the respective electronic version of the document is generated based on annotated values associated with the respective electronic version of the document and a defined set of keys. The defined set of keys may, for example, be associated with a type of document depicted in the respective electronic version of the document, such that different types of documents are associated with different sets of keys but different versions of the same type of document are associated with the same set of keys. The annotated values, meanwhile, may comprise data that was manually identified as corresponding to values assigned to one or more keys (or fields) in the respective electronic version of the document.

Each electronic version of a document in the training data set may be associated with multiple locations in which key-value sets are located. As discussed, because keys and values need not be limited to one-to-one relationships in which a single key is associated with a single value, each location in which a key-value set is located in an electronic version of a document may be associated with one or more keys and one or more values. For example, a key, which generally identifies a type of data that may be stored in a field, may be associated with one or multiple values. In another example, a field may include multiple keys, and each key may be associated with one or multiple values.

While FIG. 3 illustrates the training of the first and second machine learning models as a sequential process, it should be understood that these processes may also be performed in parallel or substantially in parallel. Generally, training of the first machine learning model may be independent of and not depend on training of the second machine learning model. Likewise, training of the second machine learning model may be independent of and not depend on training of the first machine learning model.

Figure 4:
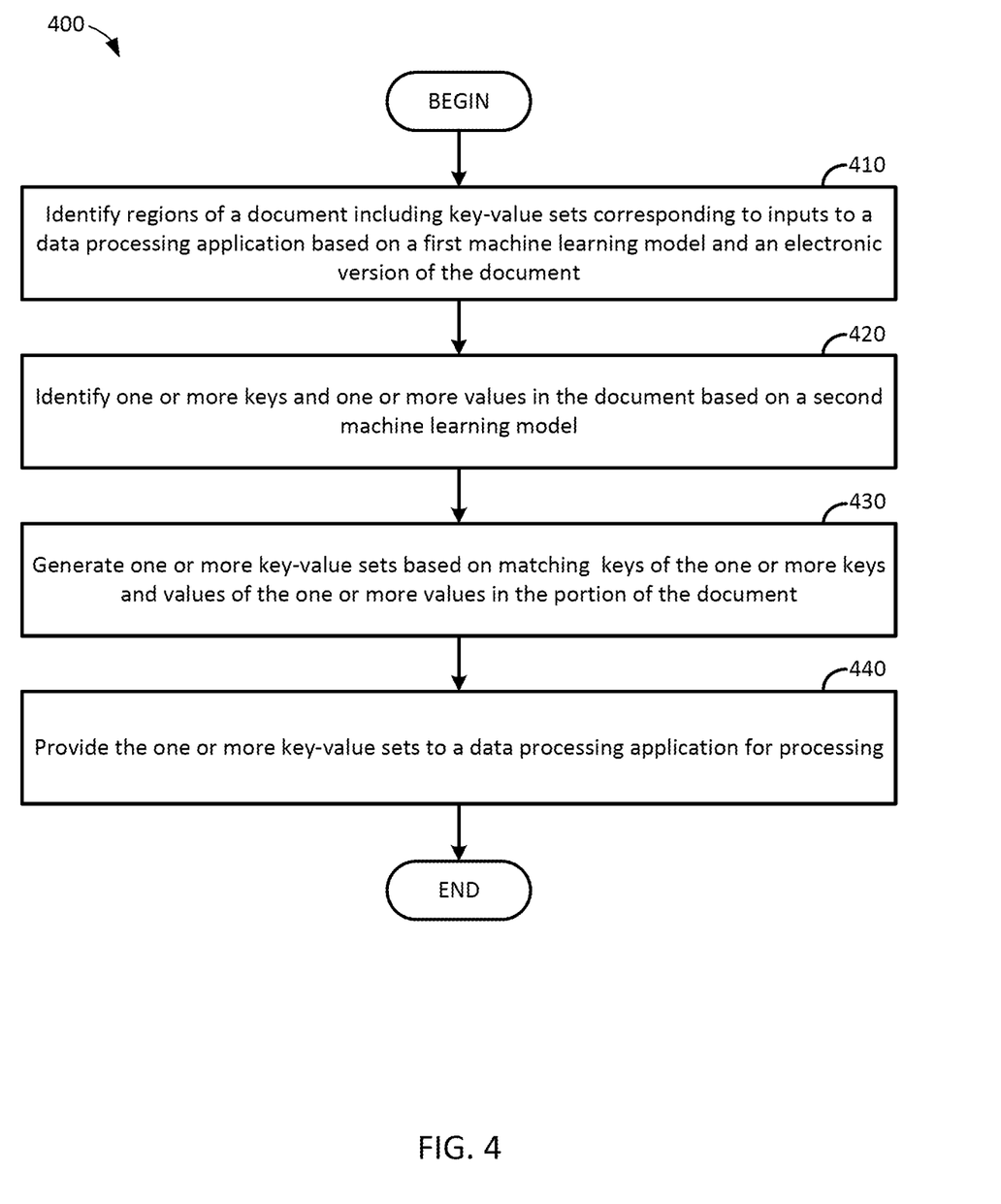
FIG. 4 illustrates example operations for generating key-value sets from a document using first machine learning model configured to identify regions in a document in which key-value sets are located and a second machine learning model configured to identify keys and values in a document.

Example Computer-Implemented Method for Extracting Key-Value Sets from a Plurality of Documents Using a Machine Learning Models FIG. 4 illustrates example operations 400 for extracting key-value sets from documents using machine learning models. Operations 400 may be performed, for example, by region identifier 110, key and value data identifier 120, and/or key-value set generator 130 illustrated in FIG. 1.

As illustrated, operations 400 begin at block 410 with identifying regions of a document including key-value sets corresponding to inputs to a data processing application based on a first machine learning model and an electronic version of the document.

In some aspects, regions of a document including key-value sets are identified based on a first machine learning model (e.g., a machine learning model deployed to region identification module 110 illustrated in FIG. 1) trained to generate a plurality of regions of interest identifying locations in the electronic version of the document corresponding to locations of the key-value sets. Each bounding box may represent an area in which one or more keys and one or more associated values are located in the electronic version of the document. As discussed, keys and values may not be limited to one-to-one relationships in which a single key is associated with a single value; within any given bounding box, one key may be associated with one or multiple values, and one or multiple keys may be present within a bounding box identified in the electronic version of the document.

In some aspects, the first machine learning model may be a neural network trained to mask regions of the electronic version of the document that includes key-value sets and to segment an unmasked region of the document into a plurality of segments, each segment corresponding to a location of a single key-value set. The neural network may be, for example, a MaskRCNN or other convolutional neural network in which a neural network can generate a plurality of masks for an electronic version of the document. Each mask may mask, or obscure, a different region of the document. Any pair of masks generated by the first machine learning model may partially, but not wholly, overlap so that each mask is associated with a different region of the electronic version of the document.

At block 420, operations 400 proceed with identifying one or more keys and one or more values in the document based on a second machine learning model, which may be a machine learning model deployed to key and value data identifier module 120 illustrated in FIG. 1. Generally, the second machine learning model may be a machine learning model trained to analyze textual content extracted from the electronic version of the document (e.g., via optical character recognition or other techniques for extracting textual content from images) based on tokenized versions of textual content extracted from the electronic version of the document. Each token may represent a single word or sequence of characters extracted from the electronic version of the document (e.g., a sequence of characters that are not separated by whitespace, punctuation, or some other delimiter that distinguishes between discrete strings of text in the document.

In some aspects, the second machine learning model may be a multimodal model trained to classify textual content in the electronic version of the document as one of a key, a value, or other content based on modalities of text, images, and layout in the document. The multimodal model may implement, for example, a transformer architecture or other architecture in which self-attention is used to generate inferences for an input data set.

At block 430, operations 4proceed with generating one or more key-value sets based on matching keys of the one or more keys and values of the one or more values in the region of the document. In some aspects, matching keys and values in the region of the document may include linking keys and values that are present in the same region of the document together. As discussed, the first machine learning model generates a plurality of segments of an image of a document, with each segment corresponding to a location in which a key-value set is located. However, because the first machine learning model generates the plurality of segments as coordinates representing specific regions of the document but does not itself identify which keys and values are present in any specific region of the document, the keys and values extracted from the document by the second machine learning model are generally used to identify which keys and values are present in any specific region of the document.

To link keys and values to a specific region of an electronic version of a document, optical character recognition techniques may be used to identify words or phrases in each specific region of the document. After text is extracted from a specific region of an electronic version of a document, word matching techniques can be used to identify likely matches between the extracted text and specific keys and values identified in the document by the second machine learning model at block 420, discussed above. If a match is found between a key in the extracted set of keys and the extracted text, the specific region of the electronic version of the document is associated with that key. Matches found between values in the extracted set of values and the extracted text may be associated with the specific region of the electronic version and the identified key, thus resulting in the generation of a key-value set for that specific region of the document.

At block 440, operations 400 proceed with providing the one or more key-value sets to a data processing application for processing. As discussed, the keys may indicate the names of variables or fields into which the associated values are to be input. After inputting the one or more key-value sets into the data processing application for processing, one or more processes may be executed to execute a workflow in the data processing application. For example, in a tax preparation workflow, the key-value sets may be used to populate various fields within the tax preparation workflow that provide the inputs needed to calculate a user's tax liability for a given tax year. In another example, in an invoicing workflow, the key-value sets may be used to populate various fields within an invoice generation workflow that calculates a total amount due to be paid, an amount of tax to be paid on the goods and services included in the invoice, and the like, and to initialize a payment workflow when the necessary information is provided into the workflow.

Figure 5:
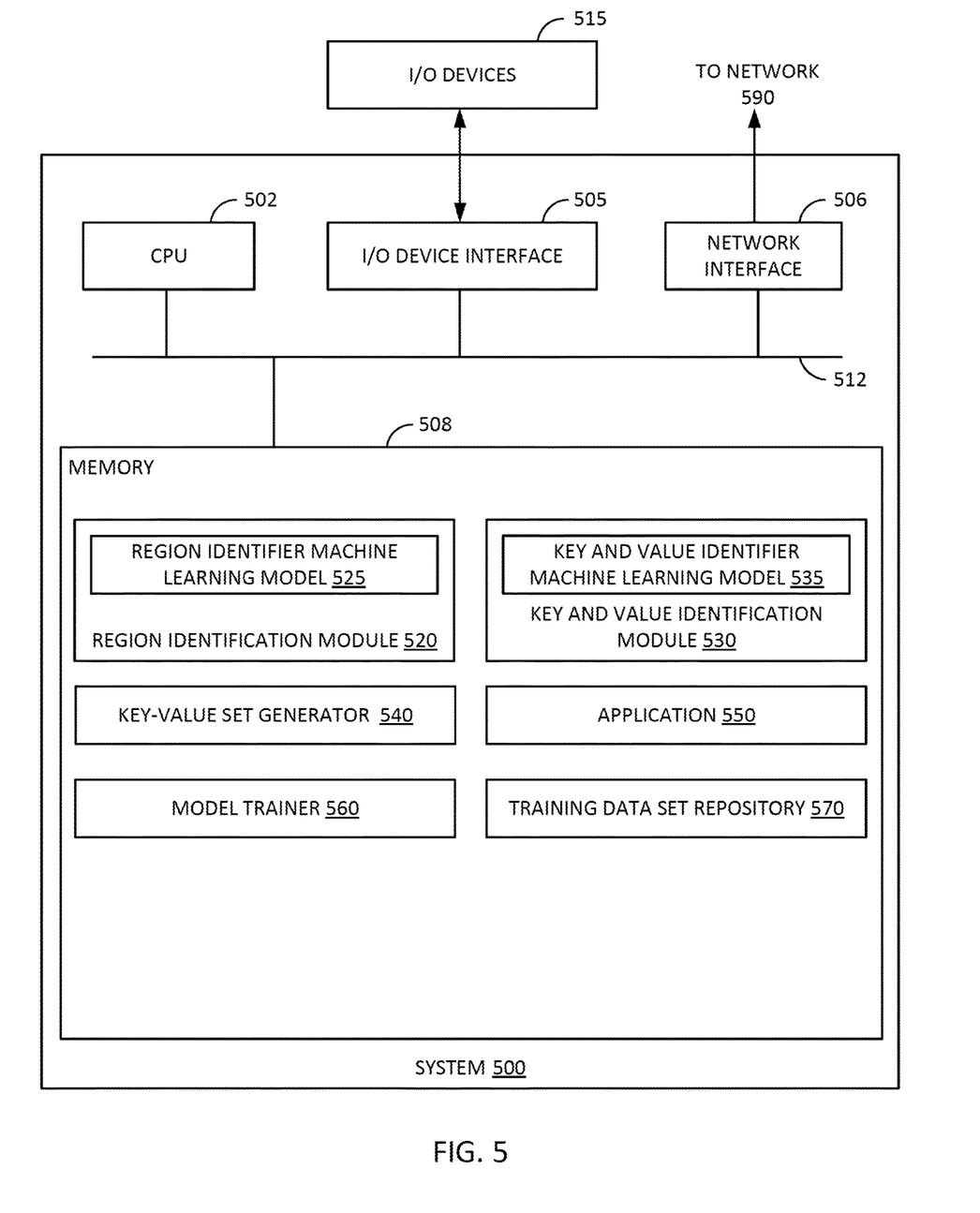
FIG. 5 illustrates an example computing system with which embodiments of the present disclosure may be implemented.

Example System for Training and Using Machine Learning Models to Extract Key-Value Sets from Documents Using Machine Learning Models FIG. 5 illustrates an example system 500 that trains and uses machine learning models to extract key-value sets from a variety of documents using machine learning models. In one example, system 500 may comprise a computing system on which region identifier 110, key and value data identifier 120, key-value set generator 130, and software application 130 illustrated in FIG. 1 may be executed.

As shown, system 5includes a central processing unit (CPU) 502, one or more I/O device interfaces 504 that may allow for the connection of various I/O devices 514 (e.g., keyboards, displays, mouse devices, pen input, etc.) to the system 400, network interface 506 through which system 500 is connected to network 590 (which may be a local network, an intranet, the internet, or any other group of computing devices communicatively connected to each other), a memory 508, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes a region identification module 520, a key and value identification module 530, key-value set generator 540, application 550, model trainer 560, and training data set repository 570.

Region identification module 520 generally corresponds to region identification module 110 illustrated in FIG. 1. As illustrated, region identification module 520 uses a region identifier machine learning model 525 trained by model trainer 560 and deployed to region identification module 520 to identify regions of an electronic version of a document in which key-value sets are contained. Each identified region of the electronic version of the document, which may be defined in terms of one or more coordinates (e.g., opposing corners for a rectangular bounding box, vertices for irregularly shaped regions of interest, etc.), and each identified region of the electronic version of the document may be associated with at least one key-value pair.

Key and value identification module 530 generally corresponds to key and value identification module 120 illustrated in FIG. 1. As illustrated, key and value identification module 530 uses a key and value identifier machine learning model 535 trained by model trainer 560 and deployed to region identification module 520 to identify a set of keys and a set of values in an electronic version of a document. Generally, keys may be associated with information defining the type of data contained in a field in a document, and values may be associated with user-specific information for these fields.

Key-value set generator 540 generally corresponds to key-value set generator 130 illustrated in FIG. 1. Generally, key-value set generator 540 uses the regions of the electronic version of the document generated by region identification module 520 and the key data set and value data set generated by key and value identification module 530 to identify keys in each region of the electronic version of the document and associated values in the region of the electronic version of the document. As a result, key-value set generator 540 generates a plurality of key-value sets, which may be provided to application 550 (corresponding to application 140 illustrated in FIG. 1) for processing.

Model trainer 560 generally uses a data set of electronic versions of documents from training data set repository 570 to train region identifier machine learning model 525 and key and value identifier machine learning model 535 to identify regions of an electronic version of a document in which key-value sets are located and to identify sets of keys and sets of values in the electronic version of the document. Generally, model trainer 560 may train the region identifier machine learning model 525 and key and value identifier machine learning model 535 using supervised or semi-supervised techniques. These models are generally trained so that the region identifier machine learning model 525 and the key and value identifier machine learning model 535 can be used to extract key-value sets from any of a plurality of documents. Because the region identifier machine learning model 525 and the key and value identifier machine learning model 535 can be used to extract key-value sets from any of a plurality of documents, aspects of the present disclosure may allow for a reduction in the number of models trained and deployed for data extraction from a variety of documents to a single set of models (e.g., a single region identifier machine learning model 525 and a single key and value identifier machine learning model 535), which may reduce storage space needed to maintain document-specific models and discrete data sets associated with document-specific models, reduce the amount of processing cycles needed to maintain these models, network bandwidth used in communicating updates to these models to applications on which these models are implemented, and so on.

Example Clauses

Implementation details of various aspects of the present disclosure are described in the following numbered clauses.

Clause 1: A method, comprising: identifying regions of a document including key-value sets corresponding to inputs to a data processing application based on a first machine learning model and an electronic image of the document; identifying one or more keys and one or more values in the document based on a second machine learning model; generating one or more key-value sets based on matching keys of the one or more keys and values of the one or more values in the region of the document; and inputting the one or more key-value sets to a data processing application for processing.

Clause 2: The method of Clause 1, wherein generating the one or more key-value sets comprises: for each respective key of the one or more keys, matching the respective key to a respective value set including the one or more values based on matching the respective key to the respective value in the region of the document.

Clause 3: The method of Clause 2, wherein the respective key is associated with multiple values.

Clause 4: The method of any one of Clauses 1 through 3, wherein identifying the regions of the document including key-value sets comprises generating, using the first machine learning model, a plurality of regions of interest identifying locations in the electronic image of the document corresponding to locations of the key-value sets.

Clause 5: The method of any one of Clauses 1 through 4, wherein the first machine learning model comprises a neural network trained to mask regions of the electronic image of the document that includes key-value sets and to segment an unmasked region of the document into a plurality of segments, each segment corresponding to a location of a single key-value set.

Clause 6: The method of any one of Clauses 1 through 5, wherein the second machine learning model comprises a multimodal model trained to classify textual content in the electronic image of the document as one of a key, a value, or other content based on modalities of text, images, and layout in the document.

Clause 7: The method of any one of Clauses 1 through 6, wherein the second machine learning model comprises a model implementing a transformer architecture.

Clause 8: The method of any one of Clauses 1 through 7, wherein the first machine learning model and second machine learning model are configured to extract data from electronic images of a plurality of types of documents.

Clause 9: A method, comprising: training a first machine learning model to identify regions of an input document including key-value sets corresponding to inputs to a data processing application using a training data set including electronic images of documents labeled with information identifying locations of key-value sets in the documents and textual annotations identifying keys and values in the key-value sets; and training a second machine learning model to identify keys and values in an input document based on the training data set.

Clause 10: The method of Clause 9, further comprising generating the training data set, wherein generating the training data set comprises: retrieving a data set including a plurality of electronic images, each electronic image of the plurality of electronic images corresponding to one of a plurality of document types for which key-value sets are to be extracted using the first machine learning model and the second machine learning model; and for each respective electronic image of the plurality of electronic images: extracting text from the respective electronic image; and based on annotated value sets and a defined set of keys, generating a data set identifying keys and values in the respective electronic image.

Clause 11: The method of any one of Clauses 9 or 10, wherein each electronic image in the training data set is associated with multiple locations associated with a plurality of key-value sets.

Clause 12: The method of any one of Clauses 9 through 11, wherein training the first machine learning model comprises training a computer vision-based neural network to mask regions of the electronic image of the document that include a key-value set and segment the unmasked region of the document into a plurality of segments, each segment corresponding to a location of a single key-value set.

Clause 13: The method of any one of Clauses 9 through 12, wherein training the second machine learning model comprises training a multimodal model to classify tokens in the textual content in the electronic image of the document as one of a key, a value, or other content.

Clause 14: The method of any one of Clauses 9 through 13, wherein the second machine learning model comprises a model implementing a transformer architecture.

Clause 15: An apparatus comprising: a memory having executable instructions stored thereon; and a processor configured to execute the executable instructions to cause the apparatus to perform the operations of any one of Clauses 1 through 14.

Clause 16: An apparatus comprising: means for performing the operations of any one of Clauses 1 through 14.

Clause 17: A computer-readable medium having instructions stored thereon which, when executed by a processor, performs the operations of any one of Clauses 1 through 14.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   identifying regions of a document including key-value sets corresponding to inputs to a data processing application based on a first machine learning model and an electronic version of the document;
   identifying one or more keys and one or more values in the document based on a second machine learning model;
   generating one or more key-value sets based on matching keys of the one or more keys and values of the one or more values in each respective region of the document; and
   inputting the one or more key-value sets to a data processing application for processing.

2. The method of claim 1, wherein generating the one or more key-value sets comprises: for each respective key of the one or more keys, matching the respective key to a respective value set including the one or more values based on matching the respective key to the respective value in the region of the document.

3. The method of claim 2, wherein the respective key is associated with multiple values.

4. The method of claim 1, wherein identifying the regions of the document including key-value sets comprises generating, using the first machine learning model, a plurality of regions of interest identifying locations in the electronic version of the document corresponding to locations of the key-value sets.

5. The method of claim 1, wherein the first machine learning model comprises a neural network trained to mask regions of the electronic version of the document that includes key-value sets and to segment an unmasked region of the document into a plurality of segments, each segment corresponding to a location of a single key-value set.

6. The method of claim 1, wherein the second machine learning model comprises a multimodal model trained to classify textual content in the electronic version of the document as one of a key, a value, or other content based on input modalities of text, images, and layout in the document.

7. The method of claim 1, wherein the second machine learning model comprises a model implementing a transformer architecture.

8. The method of claim 1, wherein the first machine learning model and second machine learning model are configured to extract data from electronic images of a plurality of types of documents.

9. A system, comprising:
   a memory having executable instructions stored thereon; and
   a processor configured to execute the executable instructions to cause the system to:
      identify regions of a document including key-value sets corresponding to inputs to a data processing application based on a first machine learning model and an electronic version of the document;
      identify one or more keys and one or more values in the document based on a second machine learning model;
      generate one or more key-value sets based on matching keys of the one or more keys and values of the one or more values in the region of the document; and
      input the one or more key-value sets to a data processing application for processing.

10. The system of claim 9, wherein in order to generate the one or more key-value sets, the processor is configured to cause the system to match, for each respective key of the one or more keys, the respective key to a respective value set including the one or more values based on matching the respective key to the respective value in the region of the document.

11. The system of claim 9, wherein in order to identify the regions of the document including key-value sets, the processor is configured to cause the system to generate, using the first machine learning model, a plurality of regions of interest identifying locations in the electronic version of the document corresponding to locations of the key-value sets.

12. The system of claim 9, wherein the first machine learning model comprises a neural network trained to mask regions of the electronic version of the document that includes key-value sets and to segment an unmasked region of the document into a plurality of segments, each segment corresponding to a location of a single key-value set.

13. The system of claim 9, wherein the second machine learning model comprises a multimodal model trained to classify textual content in the electronic version of the document as one of a key, a value, or other content based on input modalities of text, images, and layout in the document.

14. The system of claim 9, wherein the first machine learning model and second machine learning model are configured to extract data from electronic images of a plurality of types of documents.

* * * * *